United States Patent
Wynn

(10) Patent No.: US 8,945,276 B2
(45) Date of Patent: Feb. 3, 2015

(54) PARALLEL FEED GAS SEPARATION MEMBRANE ELEMENT ASSEMBLY

(71) Applicant: Nicholas P. Wynn, Redwood City, CA (US)

(72) Inventor: Nicholas P. Wynn, Redwood City, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 55 days.

(21) Appl. No.: 13/912,610

(22) Filed: Jun. 7, 2013

(65) Prior Publication Data

US 2014/0360365 A1  Dec. 11, 2014

(51) Int. Cl.
  *B01D 53/22* (2006.01)
(52) U.S. Cl.
  CPC ........ *B01D 53/227* (2013.01); *B01D 2053/224* (2013.01); *B01D 2053/223* (2013.01)
  USPC ............ 95/45; 55/342; 55/343; 95/43; 95/50; 96/4; 96/8; 96/10
(58) Field of Classification Search
  CPC ........... B01D 63/043; B01D 2319/022; B01D 2319/025; B01D 2319/027; B01D 2319/04; B01D 2319/02
  USPC .......... 55/342, 343; 95/43, 45, 50; 96/4, 8, 10
  See application file for complete search history.

(56) References Cited

U.S. PATENT DOCUMENTS

| | | | |
|---|---|---|---|
| 3,774,771 A | 11/1973 | Manjikian et al. | |
| 4,083,780 A | 4/1978 | Call | |
| 4,451,369 A | 5/1984 | Sekino et al. | |
| 4,632,756 A | 12/1986 | Coplan et al. | |
| 4,906,259 A * | 3/1990 | Yen | 95/278 |
| 5,071,552 A | 12/1991 | Bikson et al. | |
| 5,092,913 A * | 3/1992 | Yen | 95/286 |
| 5,194,149 A * | 3/1993 | Selbie et al. | 210/232 |
| 5,238,563 A | 8/1993 | Smith, Jr. et al. | |
| 5,288,308 A * | 2/1994 | Puri et al. | 96/8 |
| 5,599,383 A * | 2/1997 | Dyer et al. | 96/8 |
| 6,790,350 B2 * | 9/2004 | Pex et al. | 210/184 |
| 7,404,843 B2 | 7/2008 | Kaschemekat et al. | |
| 7,425,231 B2 * | 9/2008 | Carolan et al. | 95/54 |
| 7,510,594 B2 | 3/2009 | Wynn et al. | |
| 7,556,675 B2 * | 7/2009 | Carolan et al. | 96/7 |
| 7,658,788 B2 * | 2/2010 | Holmes et al. | 96/7 |
| 7,758,670 B2 | 7/2010 | Wynn et al. | |
| 7,918,921 B2 | 4/2011 | Wynn et al. | |
| 8,114,193 B2 * | 2/2012 | Stein et al. | 95/54 |
| 2003/0121840 A1 * | 7/2003 | Pex et al. | 210/185 |
| 2005/0031531 A1 * | 2/2005 | Stein et al. | 423/579 |
| 2005/0284293 A1 * | 12/2005 | Rubas | 96/8 |
| 2006/0180022 A1 * | 8/2006 | Holmes et al. | 95/45 |

(Continued)

FOREIGN PATENT DOCUMENTS

| | | |
|---|---|---|
| EP | 1 034 834 A2 | 9/2000 |
| WO | WO 93/07958 | 4/1993 |

*Primary Examiner* — Jason M Greene
*Assistant Examiner* — Anthony Shumate
(74) *Attorney, Agent, or Firm* — J. Farrant; T. Hott

(57) ABSTRACT

A gas-separation membrane module assembly and a gas-separation process using the assembly. The assembly includes sets of manifolds, between which are mounted arrays of membrane modules, the manifolds and membrane modules forming a stack within a pressure vessel or housing. The stacked, manifolded arrangement enables many membrane elements to be fed in parallel with the gas to be treated.

11 Claims, 6 Drawing Sheets

(56) References Cited

U.S. PATENT DOCUMENTS

| | | | |
|---|---|---|---|
| 2007/0012182 A1* | 1/2007 | Doheny et al. | 95/47 |
| 2007/0039886 A1* | 2/2007 | Bruschke et al. | 210/640 |
| 2007/0137478 A1* | 6/2007 | Stein et al. | 95/54 |
| 2008/0011157 A1* | 1/2008 | Wynn et al. | 95/45 |
| 2008/0178736 A1* | 7/2008 | Carolan et al. | 95/54 |
| 2009/0020008 A1* | 1/2009 | Wynn | 95/45 |
| 2009/0084725 A1* | 4/2009 | Poklop et al. | 210/439 |
| 2010/0243549 A1* | 9/2010 | Wynn et al. | 210/180 |
| 2011/0233470 A1* | 9/2011 | Stein et al. | 252/373 |

* cited by examiner

PARALLEL FEED GAS SEPARATION MEMBRANE ELEMENT ASSEMBLY

FIELD OF THE INVENTION

The invention relates to gas separation membranes and processes. In particular, the invention relates to an assembly of multiple membrane modules contained in a single housing or pressure vessel, and to the uses thereof for gas separation.

BACKGROUND OF THE INVENTION

Gas separation membranes have been in industrial use for around 30 years. Various types of membrane are available, although almost all commercially successful membranes are polymeric membranes formed as flat sheets or hollow fibers.

For use, it is desirable to pack a large membrane area into a small volume. Because membranes are delicate, susceptible to damage and may have a limited operating life, they are normally factory-built into modules or elements.

Two predominant types of membrane modules have emerged. If the membranes are in hollow-fiber form, bundles or hanks of fibers are typically potted in a cylindrical pressure housing or tube. Feed gas may flow on the shell or bore side of the fibers. The permeate or residue gas may be routed to a single collection pipe by which it exits the module.

Flat-sheet membranes are commonly packaged into spiral-wound modules. A spiral-wound module has a central permeate collection pipe, around which are wound multiple membrane envelopes interleaved with spacers to define feed and permeate channels. Feed passes axially down the module across the membrane envelope; permeate spirals inward to the collection pipe.

Modules or elements are normally built in standard sizes. For use, the elements are contained in pressure housings. Each element may be contained within its own housing. Such arrangements are used for hollow-fiber modules, for example, if the number of modules required to perform the separation is modest.

Often the gas mixture being separated includes flammable or hazardous components, so the housing must be made from materials able to safely contain such components. In addition, each housing requires its own piping, valves and connections. As a result, the cost of the housing may far exceed the cost of the membrane element it is designed to hold, making the use of one housing per element very unattractive.

Arrangements that attempt to control costs and reduce the complexity of piping and connections by housing multiple modules within one pressure vessel are in use. For example, individual spiral-wound modules or elements are often housed end-to-end, typically in a line of up to about six modules, within a single pressure-coded stainless or carbon steel tube. Nevertheless, many housings may be required. In natural gas processing, for example, the volume of raw gas being treated can be so large that hundreds or thousands of pressure tubes are used.

The performance of the membrane system is affected by the size and geometry of the membrane elements. For both spiral-wound and hollow-fiber modules, the longer the module, the longer is the flow path for feed or permeate fluids along the membrane surfaces. The result can be a substantial pressure drop from one end of the module to the other on the permeate side, the feed side or both. For example, in a long, shell-side feed hollow-fiber module, the pressure drop on the permeate side along the fiber bores may be as much as 50 psi or more. Such parasitic pressure drops lead to reduced feed-to-permeate pressure ratio and pressure difference, and can adversely affect both the flux and separation capability of the module. Similar effects occur along the leaves of spiral-wound modules. Maintaining acceptably low pressure drop along the feed and permeate channels means that fluid flow path lengths within the modules should preferably be short.

The performance of the membrane system is also affected by the arrangement of the elements in the housing. When elements are connected end-to-end in a tube, the gas to be separated is treated in each module in series. The residue from the first module flows as feed to the second, and so on. Thus, each module in the series experiences a different feed flow and composition, because each subsequent module is treating the residue gas from the adjacent upstream module. If elements can be fed in parallel, then each element will be exposed to the same feed composition and will operate at the same stage cut.

In light of the above issues, there has long been incentive to design configurations by which multiple short elements can be housed within a single housing, and housed in such a way that all of the elements can be fed in parallel.

Over the years various arrangements, many specific to reverse osmosis but some applicable to gas separation, have been proposed for arranging multiple membrane modules or elements within a single pressure housing.

U.S. Pat. No. 3,774,771 describes an assembly of modules mounted in parallel within a single housing. The modules are contained within feed flow tubes, connected so that feed can be introduced to several tubes in parallel, then passed back along the housing through another set of tubes.

U.S. Pat. No. 4,083,780 describes an assembly containing multiple tubes arranged in parallel, with multiple spiral-wound modules mounted in series within each tube.

U.S. Pat. No. 4,451,369 describes an assembly having multiple pairs of hollow fiber modules with a manifolded permeate collection system.

U.S. Pat. No. 4,632,756 describes an assembly in which six hollow fiber elements are mounted within a housing and can be fed in parallel. The assembly includes six permeate tubes for separate withdrawal of permeate from each element.

U.S. Pat. No. 5,071,552 describes an assembly for providing parallel feed to multiple membrane elements in a single housing. The elements are mounted in an end-to-end serial arrangement within the housing.

U.S. Pat. No. 5,238,563 describes an assembly in which multiple membrane modules or elements are housed in parallel. The feed is introduced through a nozzle in the longitudinal shell of the housing and occupies the space between the external surfaces of the modules and the internal surface of the housing.

U.S. Pat. Nos. 7,404,843; 7,510,594; 7,758,670 and 7,918,921, all co-owned with the present application, disclose various configurations for containing gas-separation elements held in an array of tubes within a single pressure housing.

Despite the above innovations, the need for feeding many elements in parallel has not been satisfactorily met. This need is becoming more acute as better, more permeable membranes are being developed.

There remains a need for assemblies that enable many gas separation membrane modules to be housed together in a single pressure housing, and preferably to provide for all of the elements to operate in parallel.

SUMMARY OF THE INVENTION

The invention has two aspects: a gas-separation membrane assembly, and a gas-separation process using the assembly.

The assembly includes a pressure housing or vessel that conveniently comprises a cylindrical shell with two ends, at least one of which is removable. Typically, but not necessarily, the ends may take the form of dished heads.

The housing contains a layered or stacked arrangement of manifolds connected by gas collectors, the manifolds preferably being shaped as shallow drums mounted with their axes aligned with the axis of the shell. The gas collectors are pipes or tubes running essentially parallel to the axis of the shell. One collector is a permeate collector, the other is a residue collector. The collectors pass through the manifolds and are perforated at intervals along their lengths to enable gas to pass between the manifolds and the collectors.

The manifolds are of two types or sets. The first receives permeate gas from the membrane elements and discharges such gas to the permeate collectors. The manifolds in this set are designated permeate manifolds. The second type is used to receive residue gas from the membrane elements and discharge such gas to the residue collector. The manifolds in this set are designated residue manifolds. Residue and permeate manifolds alternate within the stack. The stack usually contains at least two residue and two permeate manifolds, but may contain any number of manifolds.

The manifolds are spaced apart from one another so that arrays or layers of membrane elements may be mounted between them. The number of elements that are contained within one array or layer will depend on the diameter of the housing, but will generally be at least five elements and may be many more.

Between the alternating manifolds, the membrane elements are aligned with their permeate ends towards the permeate manifold and their residue ends towards the residue manifold. At each end, the modules abut against or fit into openings in the manifolds so that gas-tight connections are made between the modules and the respective manifolds. Because the manifold types alternate, the orientation of each layer of elements is reversed compared with the adjacent layer(s) of elements, as will become clearer from the discussion of the drawings below.

The modules may be of any type usable for gas separation, but preferably will be hollow-fiber or spiral-wound modules incorporating polymeric membranes.

The housing is equipped with a feed nozzle, through which gas to be treated is introduced into the interior of the vessel. The vessel is further equipped with a residue nozzle and a permeate nozzle. The residue nozzle is adapted to connect to the residue collector or to allow passage of the residue collector out of the vessel. Likewise, the permeate nozzle is adapted to connect to the permeate collector or to allow passage of the permeate collector out of the vessel. Conveniently, the residue and permeate nozzles are positioned on a removable head.

In its most general embodiment, the assembly described above includes the following elements:
(a) a housing comprising first and second ends and a cylindrical shell connecting the ends, at least one of the ends being a removable head;
(b) a set of at least 10 gas separation membrane elements, each element being equipped to accept a feed gas from within the housing, and to discharge a permeate gas at a permeate end and a residue gas at a residue end;
(c) a stack of alternating permeate and residue gas-collection manifolds, the stack being aligned lengthwise within the shell, the manifolds being spaced apart with a sub-set of the membrane elements mounted between sequential manifolds, each membrane element within the subset being (i) aligned with its permeate end adjacent to the permeate manifold and its residue end adjacent to the residue manifold, and (ii) connected in gas-transferring relationship to the manifolds such that the permeate gas may enter only the permeate manifold and the residue gas may enter only the residue manifold;
(d) a permeate collector element aligned lengthwise within the shell, passing through the residue and permeate manifolds, and being connected in gas-transferring relationship to the manifolds such that permeate gas from the permeate gas-collection manifolds may enter the permeate collector element but residue gas from the residue gas-collection manifolds may not enter the permeate collector element;
(e) a residue collector element aligned lengthwise within the shell, passing through the residue and permeate manifolds, and being connected in gas-transferring relationship to the manifolds such that residue gas from the residue gas-collection manifolds may enter the residue collector element but permeate gas from the permeate gas-collection manifolds may not enter the residue collector element;
(f) a feed inlet in the housing adapted to introduce a feed gas stream into the housing;
(g) a permeate outlet in the housing adapted to enable permeate gas from the permeate collector element to be withdrawn from the housing;
(h) a residue outlet in the housing adapted to enable residue gas from the residue collector element to be withdrawn from the housing.

In a second aspect, the invention is a gas separation process using an assembly as described above. In its most general embodiment, the process includes the following steps:
(a) feeding a mixed gas stream comprising at least first component and a second component to the feed inlet;
(b) providing a driving force for transmembrane permeation;
(c) withdrawing from the residue outlet a residue stream depleted in the first component compared with the mixed gas stream;
(d) withdrawing from the permeate outlet a permeate stream enriched in the first component compared with the mixed gas stream.

When the vessel is in use, the interior space is filled with feed gas and is, therefore, at the feed gas pressure, and the external surfaces of each individual membrane element are exposed to the feed gas. The feed gas may enter each element at any convenient point, such as at one end or at some point along the longitudinal surface. The residue and permeate gases are collected in their respective collectors and withdrawn from the vessel.

The process may be used to separate components of any gas mixture, but is expected to be especially useful in separations involving flammable or hazardous components, particularly where gas flow rates tend to be large and gas pressures are high. Specific examples include: natural gas treatment, such as to remove carbon dioxide, heavier hydrocarbons, or nitrogen from methane; refinery off-gas treatment, such as to recover hydrogen or valuable liquefiable hydrocarbons from fuel or flare gas; and treatment of process or waste streams in large petrochemical plants.

While not limited to operation in such manner, the invention facilitates low stage cut processes, where most of the feed gas will remain in the residue stream. Such processes are useful, for example, when the user requires a relatively high-purity permeate stream, but is less concerned about overall recovery, or when a relatively small amount of a contaminant needs to be removed to meet target specs. Non-limiting examples might include treating a natural gas stream that is only slightly out of spec, or recovering some extra hydrogen or LPG from a fuel gas.

The assembly and processes using the assembly have been described so far as they relate to the situation where the feed gas to be treated occupies the interior of the vessel and the residue gas occupies the residue manifolds and collectors. Alternative apparatus and process configurations, in which a manifold system is used to distribute the feed gas and the residue gas passes out of the individual membrane elements into the interior of the vessel, are also possible. In such an embodiment, the assembly comprises:

(a) a housing comprising first and second ends and a cylindrical shell connecting the ends, at least one of the ends being a removable head;
(b) a set of at least 10 gas separation membrane elements, each element being equipped to accept a feed gas at a feed end, and to discharge a permeate gas at a permeate end and a residue gas into the housing;
(c) a stack of alternating feed and permeate manifolds, the stack being aligned lengthwise within the shell, the manifolds being spaced apart with a sub-set of the membrane elements mounted between sequential manifolds, each membrane element within the subset being (i) aligned with its permeate end adjacent to the permeate manifold and its feed end adjacent to the feed manifold, and (ii) connected in gas-transferring relationship to the manifolds such that the permeate gas may enter only the permeate manifold and the feed gas may exit only the feed manifold;
(d) a permeate collector aligned lengthwise within the shell, passing through the feed and permeate manifolds, and being connected in gas-transferring relationship to the manifolds such that permeate gas from the permeate manifolds may enter the permeate collector but feed gas from the feed manifolds may not enter the permeate collector;
(e) a feed distributor aligned lengthwise within the shell, passing through the feed and permeate manifolds, and being connected in gas-transferring relationship to the manifolds such that feed gas from the feed distributor may enter the feed manifolds but permeate gas from the permeate manifolds may not enter the feed distributor;
(f) a residue outlet in the housing adapted to enable residue gas to be withdrawn from the housing;
(g) a permeate outlet in the housing adapted to enable permeate gas from the permeate collector to be withdrawn from the housing;
(h) a feed inlet in the housing adapted to enable feed gas to be introduced through the feed distributor to the feed manifolds.

The process is then carried out by introducing the feed gas to the feed distributor, whence it passes to the feed distributors and the individual membrane elements. The permeate gas is withdrawn via the permeate manifolds and collector as before; the residue gas exits the modules and fills the interior space of the vessel, and is withdrawn thence through the residue outlet.

DETAILED DESCRIPTION OF THE INVENTION

The terms vessel and housing are used interchangeably herein.

The terms membrane module and membrane element are used interchangeably herein.

The terms layer, array and sub-set as they refer to an arrangement of membrane modules are used interchangeably herein.

The invention is a gas-separation membrane assembly, and a gas-separation process using the assembly. The assembly is able to accommodate many gas-separation membrane modules or elements within a single vessel or housing. The modules are mounted in layers between gas-collecting manifolds, the layers of elements and manifolds forming a stack that is aligned longitudinally along the housing.

Feed gas to be treated by membrane separation can be introduced into the housing and then to each element in parallel; the separated, treated gas can be withdrawn from the housing.

Figure 1:
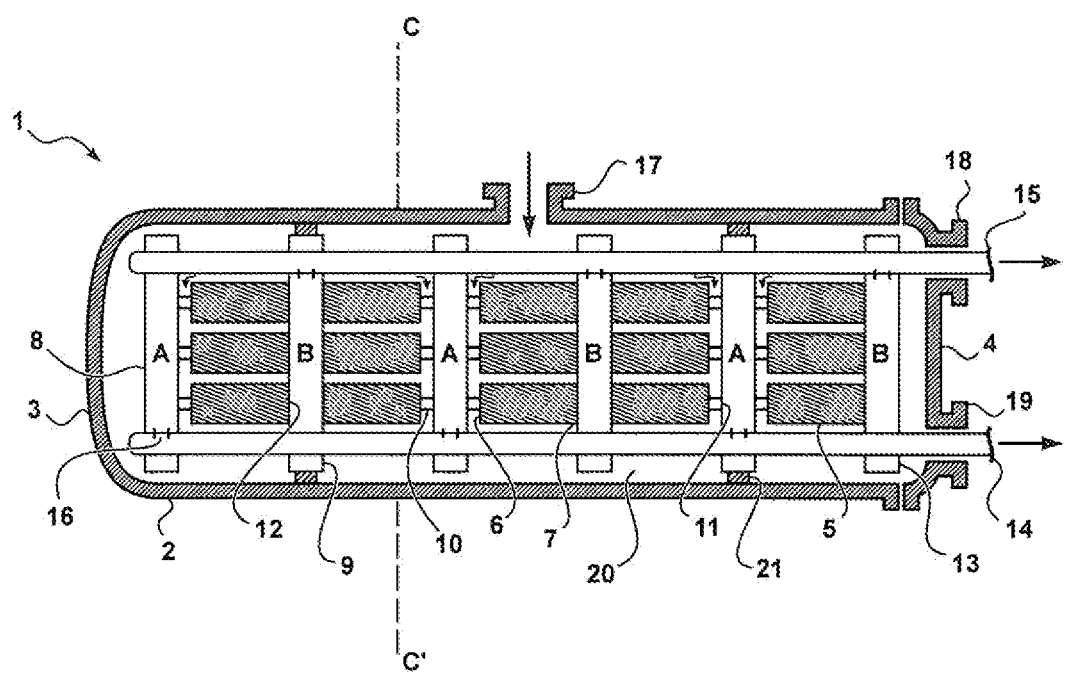
FIG. 1 is a schematic drawing showing a longitudinal section through an assembly of the invention able to accommodate 17 membrane elements per layer, and a possible gas flow when the assembly is in use for gas separation.

A basic embodiment of the invention, including the elements or main features of the assembly, is shown as a simplified schematic drawing of a lengthwise section in FIG. 1. Referring to this figure, the assembly includes a vessel, generally indicated by numeral, 1.

The vessel may be of any form appropriate to its function, which is to provide an internal environment in which membrane gas separation can be carried out safely at substantially higher (or lower) pressures than the outside atmospheric pressure. A variety of vessel shapes are possible within the scope of the invention, although typically the housing is of elongated form. Most preferably the housing has a cylindrical shell, 2, and two ends, as shown in the figure.

At least one of the ends, and optionally both, should be a reversibly removable end cap or head, to provide access to the interior of the vessel for installation or removal of membrane modules. The end caps may have any appropriate profile, but usually will be flat or dished. Removable heads typically include a flange or flanges or a screw thread for attachment to the shell body of the vessel. The figure shows the case where one end, 3, is unitary with the vessel and the other is a removable dished and flanged head, 4.

The material of which the vessel is formed may vary depending upon the use to which it is to be put and the pressure-rating required. Typically the vessel will be metal, usually steel, either stainless or carbon, although other metals, or even non-metallic materials, could be used in some circumstances.

Within the vessel are multiple gas separation membrane elements, 5, arranged in arrays or layers between a series of permeate manifolds, 8, and residue manifolds, 9. For ease of identification, the permeate manifolds are labeled A and the residue manifolds are labeled B on the figure. Within each layer of membrane elements, the elements are oriented with their permeate ends, 6, to the permeate manifolds and their residue ends, 7, to the residue manifolds.

The type and configuration of the membranes and modules is not a limiting aspect of the invention. The membranes may be any type of membrane usable for gas separation, including, but not limited to, polymeric membranes with a rubbery selective layer and polymeric membranes with a glassy selective layer.

Likewise, any types of modules known in the gas separation arts and adapted for permeate removal from one end of the element and residue removal from the other can be housed in the present assembly. Most commonly, however, the modules will be spiral-wound or hollow-fiber modules, both of which forms are well known in the art and are described copiously in the literature. For simplicity, the details of module placement and connection are shown in FIG. 1 and described below as they relate to polymeric membranes packaged as spiral-wound modules. Those of skill in the art will appreciate that similar arrangements of modules within the housing can be used for hollow-fiber modules or other arrangements, subject only to minor, straightforward modifications as need be.

As mentioned in the background section, a spiral-wound module comprises one or more membrane envelopes of spacers and membrane wound around a perforated central permeate collection pipe. This permeate pipe, 10, protrudes a short distance beyond the membrane envelopes.

When each membrane element is mounted in the assembly, the permeate pipe fits against or protrudes into an aperture, 11, in the permeate manifold, so that gas can pass from the permeate pipe into the permeate manifold. A gas-tight seal is maintained between the permeate pipe and the permeate manifold. This seal may be achieved, for example, by using an O-ring (not shown on the figure for clarity), or by any other convenient type of seal or fitting.

During operation of the assembly, the permeate manifolds are subjected to whatever pressure difference is maintained between the feed gas and the permeate gas, and should be made of suitable steel or the like and pressure-rated accordingly. In FIG. 1, the permeate manifolds, 8, are shown simply as shallow hollow drums, although any equivalent form able to receive the permeate gas and withstand the feed/permeate pressure difference could be used.

The interior of the manifold may be structured to facilitate the pressure-withstanding function. As just one example, the manifold can be formed by welding or otherwise securing two profiled plates together, so as to leave space between the inside surfaces of the plates.

Figure 5:
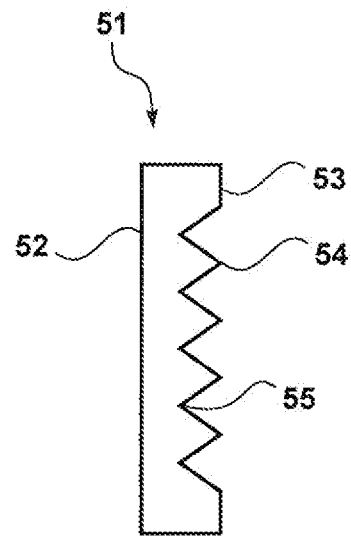
FIG. 5(a) shows a machined plate suitable for use in the permeate manifold.
FIG. 5(b) shows two machined plates to be joined to form a permeate manifold
Figure 5:
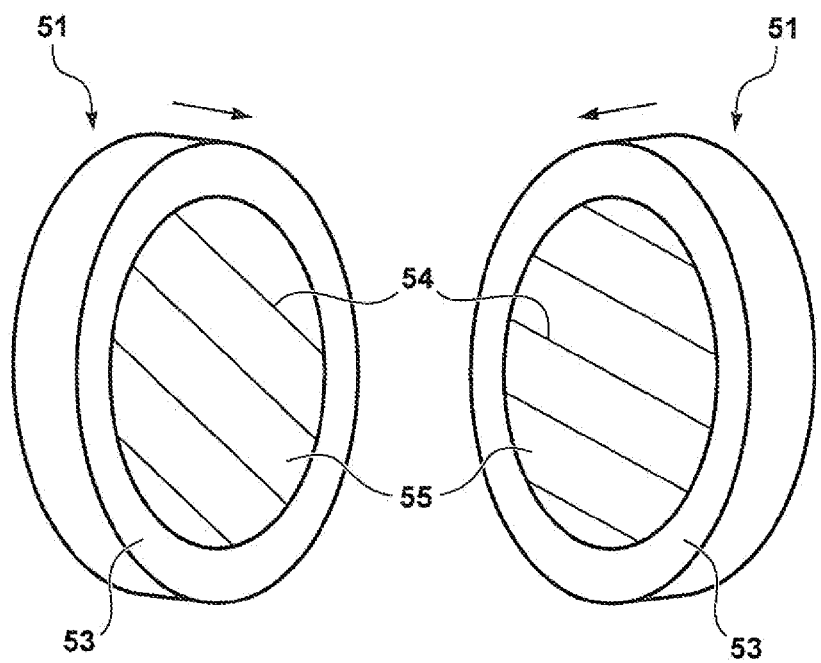

An example of a profiled plate, which can readily be manufactured by machining one surface of the plate, is shown in FIG. 5(a). The plate, 51, has a flat surface, 52, and a profiled surface, 53, which has been machined to form a series of teeth, 54, and grooves, 55. Two such plates may be joined to form a permeate manifold, as shown in FIG. 5(b). When the plates are brought together, as indicated by the direction of the arrows, so that the profiled surfaces are in contact with each other, the teeth and grooves of the two plates will be offset at an angle. The spaces and channels formed by the offset grooves form the manifold interior into which the permeate gas may be collected from the modules, and through which it may flow to the permeate collector.

In a typical spiral-wound module, the residue gas is withdrawn from the open edges of the membrane envelopes across the residue end, 7, of the module. When the membrane element is in place in the assembly, the residue end fits against or protrudes an aperture, 12, in the residue manifold, so that gas can pass from the end of the element into the residue manifold. As with the permeate pipes, a fitting, clamp or seal is used between the residue ends and the residue manifolds to ensure a gas-tight connection.

Like the permeate manifolds, the residue manifolds are shown in FIG. 1 as shallow hollow drums, but could take other forms as convenient. Unlike the permeate manifolds, the residue manifolds are exposed to only whatever small pressure drop occurs between the feed and residue gas, so can be manufactured from relatively thin and lightweight materials.

In addition to the apertures to receive the permeate pipes and residue ends of the modules, both the residue and the permeate manifolds include apertures, 13, through the entire thickness of the manifold through which gas collectors, 14 and 15, may pass. Yet again, gas-tight fittings or seals hold the collectors and manifolds together such that gas cannot leak between the interior, 20, of the vessel and the interiors of the manifolds.

The gas collectors take the form of pipes or tubes running the length of the vessel interior. One collector is a permeate collector, 14, the other is a residue collector, 15. As with the permeate manifold, the permeate collector will be exposed to the relatively large feed-to-permeate pressure drop, and should be pressure-rated accordingly, whereas the residue collector will be exposed to only a small pressure difference and can be made comparatively thin and lightweight.

The collectors are perforated by a series of holes or slits, 16, suitably positioned at intervals along their lengths to enable gas to be transferred between the interiors of the manifolds and their respective collectors.

The housing is equipped with a feed inlet, port or nozzle, 17, through which gas to be treated is introduced into the interior of the vessel. The feed nozzle is shown at about the midpoint of the shell, but may be placed elsewhere if desired. The vessel is further equipped with a residue outlet, port or nozzle, 18, and a permeate outlet port or nozzle, 19. The residue nozzle is adapted to connect to the residue collector or to allow passage of the residue collector out of the vessel. It is thus convenient, although not necessary, to position this nozzle at one end of the vessel on the removable head, as shown in the figure. Likewise, the permeate nozzle is adapted to connect to the permeate collector or to allow passage of the permeate collector out of the vessel, and is conveniently positioned on the head.

To avoid movement of the stack within the vessel, the stack may optionally be supported against the interior surface of the vessel by supports, 21.

Figure 2:
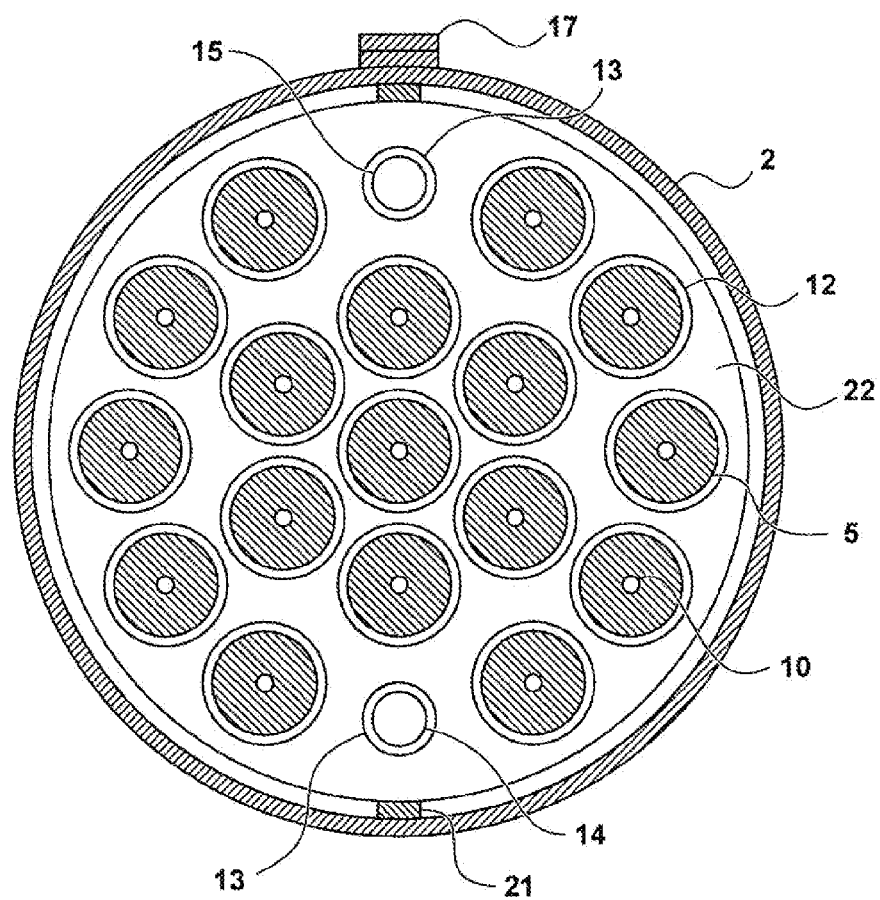
FIG. 2 is a schematic drawing showing a cross-section of the assembly through plane C-C' of FIG. 1, showing placement of a layer of 17 membrane modules between manifolds.

In principle, various ways to arrange the membrane elements within each array or layer of the stack can be imagined within the scope of the invention. Preferably, the elements of each layer should be packed efficiently into the housing, so as not to leave large volumes of space unoccupied between them. FIG. 2 is a schematic drawing of a cross-section of the assembly through plane C-C' of FIG. 1, showing placement of a closely packed layer of 17 membrane modules between pairs of manifolds.

Referring to FIG. 2, in which like elements are labeled as in FIG. 1, the face, 22, of the residue manifold, 9, is pierced by openings or apertures, 12, in which can be seen the cross section of membrane elements, 5, with central permeate pipes, 10. The array of elements is concentric, with a single element in the center, then an inner ring of six elements, and an outer ring of elements. Two of the positions in the outer ring are occupied by the apertures, 13, that carry the residue collector, 15, and the permeate collector, 14, so that 10 positions are left for membrane elements. As can be seen, therefore, when full the layer contains 17 membrane modules. With 17 modules per layer or array and five arrays as shown, the assembly of FIG. 1 can hold 85 modules within a single vessel.

In light of the above discussion, it will be apparent that, within the scope of the invention, assemblies required to hold a given number of elements can be designed to hold more membrane elements per layer and fewer layers, or fewer elements per layer and more layers.

The vessel shown in FIG. 1, albeit not to scale, is of relatively large diameter and short overall length. As an alternative, the same 85 elements could be housed in a vessel with five membrane modules per layer and 17 layers. In this case, the vessel diameter would be less, but the length would be more than three times as long to accommodate the many layers. In general, based on case and cost of manufacture, we prefer to avoid both very fat and short vessels and very long, thin vessels. Preferably, the overall dimensions of the vessel should be such that the ratio of the vessel length to its diameter is in the range between about 3 and 8.

The process of the invention can be carried out using the assembly of FIG. 1. In this case, the feed inlet is connected to the gas supply to be treated, the residue outlet or collector is connected to pipework for directing the treated residue gas to its desired destination and the permeate outlet or collector is connected to pipework for directing the treated permeate gas to its desired destination.

Operating conditions for the process can be set by adjusting the pressures and temperatures of the incoming and outgoing gas streams by the use of conventional equipment such as compressors, blowers, vacuum pumps, chillers, heaters, heat exchangers, valves, expanders and the like, all of which are well known in the gas separation arts.

The gas flow directions into, within, and out of the assembly during use are indicated by the arrows on FIG. 1.

Feed gas, preferably at an elevated pressure, enters the assembly as shown by the arrow in feed nozzle, 17, and fills the interior, 20, of the assembly, thereby exposing the exterior surfaces of the membrane elements to the feed gas. At least a portion of the exterior surface is open to gas flow, so that gas can enter the feed channels of the modules.

If the modules are spiral-wound modules containing flat sheet membranes, the outer longitudinal surfaces of the modules are usually sealed by a fiberglass wrap or the like, and the feed gas will enter at the same end of the module as that from which the permeate is withdrawn, as indicated by the arrows.

The feed gas mixture passes through the modules and is separated into two portions: a residue gas stream, which has not permeated the membranes, and a permeate gas stream, which has permeated the membranes. The residue gas stream passes from the modules into the residue manifolds and residue collector and is withdrawn through port or outlet, 18. The permeate gas stream passes into the permeate manifolds and collector and is withdrawn through port or outlet, 19.

The process may be carried out on any mixed gas stream containing at least two components that are to be separated. In general, the processes of the invention are expected to be particularly beneficial from a cost and safety perspective in situations where the gas stream to be treated includes flammable or hazardous components, such as hydrocarbons. As non-limiting examples of such situations, the mixed gas stream may be:
- a natural gas stream, from which it is desired to remove carbon dioxide, nitrogen or $C_{3+}$ hydrocarbons
- a refinery off-gas or fuel gas stream, from which it is desired to recover hydrogen or $C_{3+}$ hydrocarbons
- a process stream or off-gas stream from a petrochemical plant containing a hydrocarbon mixture.

Figure 3:
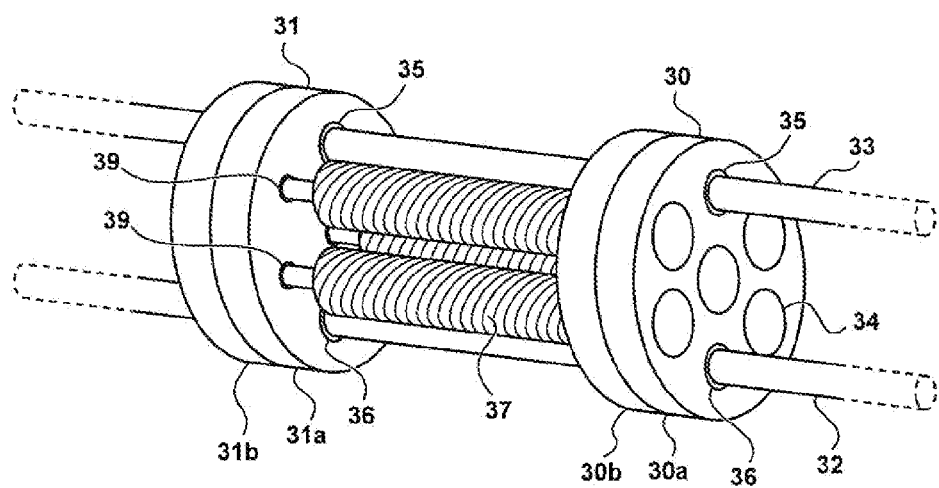
FIG. 3 is a drawing showing certain internals of the housing, with five membrane elements mounted between a residue and permeate manifold.

For further understanding of the invention, FIG. 3 shows a portion of the manifold stack as it would appear when outside the vessel, such as during mounting of the membrane elements into the stack. For clarity, the drawing shows just one pair of manifolds, and one array of five membrane elements between the manifolds; additional manifolds and layers of membrane modules would normally be positioned to the right and left along the dashed portions of the collectors to complete the full stack.

FIGS. 1 and 2 were described above assuming that the membrane modules were spiral-wound modules with permeate pipes protruding from their ends. As was pointed out, however, the assembly can accommodate any membrane modules having permeate and residue ends with some means to withdraw gas from those ends. By way of contrast, therefore, and as a non-limiting example, FIG. 3 is described as it relates to hollow-fiber modules designed for shell-side feed. The permeate gas is assumed to be withdrawn from the open bores of the fibers at one end of the element, and the residue gas is assumed to be collected at the other end of the element and withdrawn through a residue tube.

Referring now to FIG. 3, permeate manifold, 30, comprises two plates 30a and 30b that are welded or otherwise sealed together, residue manifold, 31, likewise comprises plates 31a and 31b. Permeate collector, 32, and residue collector, 33, run through openings in the manifolds along the length of the stack. The collectors and manifolds are sealed against each other in gas-tight relationship by O-rings or seals, 35 and 36.

An array of membrane elements, 37, is installed between the manifolds. The residue tubes, 39, fit into openings in the residue manifold, and are sealed in gas-tight relationship against the manifold by O-rings, 38. At the permeate ends (not visible in the figure), the modules fit into openings in the permeate manifold. The openings, 34, for the next layer of modules are seen on the right hand face of the permeate manifold.

Figure 4:
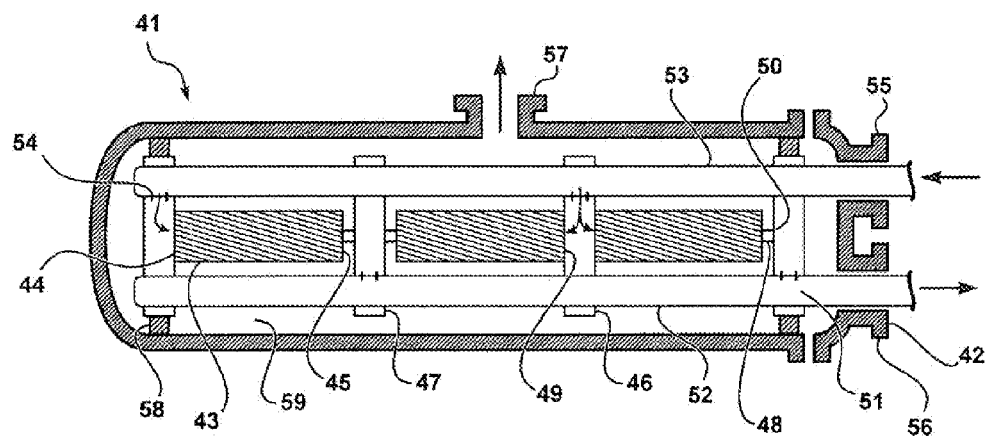
FIG. 4 is a schematic drawing showing a longitudinal section through an assembly of the invention able to accommodate 5 membrane elements per layer, and a possible gas flow when the assembly is in use for gas separation.

As has been mentioned, alternative apparatus and process configurations are possible, with one set of manifolds being connected to the feed line and being used to distribute the feed gas to all of the arrays of membrane elements. The invention in this aspect is shown in a simplified schematic drawing of a lengthwise section in FIG. 4.

Referring to this figure, the assembly includes a vessel, generally indicated by numeral, 41. Details as to choices of materials and manufacturing and assembling techniques for the vessel and other components are essentially the same as for FIG. 1, and are not repeated here.

Within the vessel are multiple gas separation membrane elements, 43, each having a feed end, 44, and a permeate end, 45, from which protrudes a permeate pipe, 48. In this representative, non-limiting case, there are five elements in each array, arranged in similar fashion to that of FIG. 3. The feed ends fit into openings, 49, in the feed manifold, 46, and the permeate pipes fit into openings 50, in the permeate manifolds, 47.

As with the other embodiments, any modules capable of being mounted with their feed and permeate ends connected to the appropriate manifolds can be used.

In addition to the apertures to receive the ends of the modules, the manifolds include apertures, 51, through which the permeate collector, 52, and the feed distributor, 53, pass. The feed distributor and the permeate collector are equipped with slits or holes, 54, to enable gas to pass into or out of the respective manifolds.

The vessel has a feed inlet, port or nozzle, 55, a permeate outlet, port or nozzle, 56, and a residue outlet, port or nozzle, 57. As with the previously described embodiments, the manifold stack is held in place by supports, 58.

When the assembly is in use, feed gas enters the assembly as shown by the arrow at feed nozzle, 55, and flows along the feed distributor and into the feed manifolds as indicated by the arrows. Permeate gas passes from the permeate pipes into the permeate manifolds, and then exits the vessel via the permeate collector 52 and permeate nozzle 56.

Residue gas exits the modules either at the permeate end or at a point along the length of the modules and flows into the open interior space, 59, of the vessel, whence it is withdrawn through the residue nozzle.

I claim:

1. A gas separation assembly, comprising:
   (a) a housing comprising first and second ends and a cylindrical shell connecting the ends, at least one of the ends being a removable head;
   (b) a set of at least 10 gas separation membrane elements, each element being equipped to accept a feed gas from within the housing, and to discharge a permeate gas at a permeate end and a residue gas at a residue end;
   (c) a stack of alternating permeate and residue gas-collection manifolds, the stack being aligned lengthwise within the shell, the manifolds being spaced apart with a sub-set of the membrane elements mounted between sequential manifolds, each membrane element within the subset being (i) aligned with its permeate end adjacent to the permeate manifold and its residue end adjacent to the residue manifold, and (ii) connected in gas-transferring relationship to the manifolds such that the permeate gas may enter only the permeate manifold and the residue gas may enter only the residue manifold;
   (d) a permeate collector element aligned lengthwise within the shell, passing through the residue and permeate manifolds, and being connected in gas-transferring relationship to the manifolds such that permeate gas from the permeate gas-collection manifolds may enter the permeate collector element but residue gas from the residue gas-collection manifolds may not enter the permeate collector element;
   (e) a residue collector element aligned lengthwise within the shell, passing through the residue and permeate manifolds, and being connected in gas-transferring relationship to the manifolds such that residue gas from the residue gas-collection manifolds may enter the residue collector element but permeate gas from the permeate gas-collection manifolds may not enter the residue collector element;
   (f) a feed inlet in the housing adapted to introduce a feed gas stream into the housing;
   (g) a permeate outlet in the housing adapted to enable permeate gas from the permeate collector element to be withdrawn from the housing;
   (h) a residue outlet in the housing adapted to enable residue gas from the residue collector element to be withdrawn from the housing.

2. A gas separation assembly, comprising:
   (a) a housing comprising first and second ends and a cylindrical shell connecting the ends, at least one of the ends being a removable head;
   (b) a set of at least 10 gas separation membrane elements, each element being equipped to accept a feed gas at a feed end, and to discharge a permeate gas at a permeate end and a residue gas into the housing;
   (c) a stack of alternating feed and permeate manifolds, the stack being aligned lengthwise within the shell, the manifolds being spaced apart with a sub-set of the membrane elements mounted between sequential manifolds, each membrane element within the subset being (i) aligned with its permeate end adjacent to the permeate manifold and its feed end adjacent to the feed manifold, and (ii) connected in gas-transferring relationship to the manifolds such that the permeate gas may enter only the permeate manifold and the feed gas may exit only the feed manifold;
   (d) a permeate collector element aligned lengthwise within the shell, passing through the feed and permeate manifolds, and being connected in gas-transferring relationship to the manifolds such that permeate gas from the permeate manifolds may enter the permeate collector element but feed gas from the feed manifolds may not enter the permeate collector element;
   (e) a feed distribution element aligned lengthwise within the shell, passing through the feed and permeate manifolds, and being connected in gas-transferring relationship to the manifolds such that feed gas from the feed distribution element may enter the feed manifolds but permeate gas from the permeate manifolds may not enter the feed distribution element;
   (f) a residue outlet in the housing adapted to enable residue gas to be withdrawn from the housing;
   (g) a permeate outlet in the housing adapted to enable permeate gas from the permeate collector element to be withdrawn from the housing;
   (h) a feed inlet in the housing adapted to enable feed gas to be introduced through the feed distribution element to the feed manifolds.

3. The assembly of claim 1 or claim 2, wherein the stack includes at least two permeate manifolds and two residue manifolds.

4. The assembly of claim 1 or claim 2, wherein the membrane elements are spiral-wound modules.

5. The assembly of claim 1 or claim 2, wherein the membrane elements are hollow-fiber modules.

6. The assembly of claim 1 or claim 2, wherein the housing has a length and a diameter, having dimensions in a ratio of length:diameter of between 3 and 8.

7. A gas separation process using the assembly of claim 1 or claim 2 and comprising the following steps:
   (a) feeding a mixed gas stream comprising at least a first component and a second component to the feed inlet;
   (b) providing a driving force for transmembrane permeation;
   (c) withdrawing from the residue outlet a residue stream depleted in the first component compared with the mixed gas stream;
   (d) withdrawing from the permeate outlet a permeate stream enriched in the first component compared with the mixed gas stream.

8. The process of claim 7, wherein the mixed gas stream comprises a hydrocarbon.

9. The process of claim 7, wherein the mixed gas stream comprises natural gas.

10. The process of claim 7, wherein the mixed gas stream comprises a refinery off-gas stream.

11. The process of claim 7, wherein the mixed gas stream comprises a petrochemical process stream.

* * * * *